United States Patent
Webster et al.

(10) Patent No.: US 6,195,755 B1
(45) Date of Patent: Feb. 27, 2001

(54) NONVOLATILE POWER MANAGEMENT APPARATUS FOR INTEGRATED CIRCUIT APPLICATION

(76) Inventors: Larry D. Webster, 8129 Rhoda Ave., Dublin, CA (US) 94568; Ehud Pardo, 121 Buckingham Dr. #33, Santa Clara, CA (US) 95051

(*) Notice: Under 35 U.S.C. 154(b), the term of this patent shall be extended for 0 days.

(21) Appl. No.: 08/287,670

(22) Filed: Aug. 9, 1994

(51) Int. Cl.[7] .................................................. G06F 1/26
(52) U.S. Cl. ............................................................ 713/330
(58) Field of Search ........................ 395/750; 364/707; 713/300, 320, 330

(56) References Cited

U.S. PATENT DOCUMENTS

| | | | | |
|---|---|---|---|---|
| 4,593,349 | * | 6/1986 | Chase et al. | 364/200 |
| 4,906,862 | * | 3/1990 | Itano et al. | 307/296.3 |
| 4,950,921 | * | 8/1990 | Takada | 307/296.1 |
| 4,952,817 | * | 8/1990 | Bolan et al. | 307/39 |

* cited by examiner

Primary Examiner—Glenn A. Auve (57) ABSTRACT

A nonvolatile power management apparatus that controls the use of power within an integrated circuit. The embodiment varies the power applied to a functional circuit within the integrated circuit. At nominal power, the functional circuit operates normally per nominal operational specifications. Under reduced power, the integrated circuit retains all of its internal states, but has its I/O nets isolated from external circuitry. This prevents latch-up of the functional circuit operating from reduced power (low power input voltage) and prevents external circuitry connected to the integrated circuit from being overloaded.

3 Claims, 4 Drawing Sheets

NONVOLATILE POWER MANAGEMENT APPARATUS FOR INTEGRATED CIRCUIT APPLICATION

FIELD OF INVENTION

This invention relates to the management of electrical power consumption in individual integrated circuits.

The invention is particularly useful, though not exclusively applicable, to CMOS integrated circuits where both control of the total power used by the integrated circuit and maintenance of state information is desirable.

BACKGROUND OF THE INVENTION

The management of the use of electric power within an electronic device has become extremely important. A device for electric power management as disclosed by Pardo/Webster in "Power Control Sequencer for Low Power and Battery Powered Applications," U.S. patent application Ser. No. 08/099,942, Jul. 30, 1993 which generally:

1) determines when a function within an electronic device is idle,
2) saves pertinent information relative to the state of that function,
3) removes the power from those components that support the function,
4) determines when the function is to be reactivated,
5) reapplies power to the powered down components associated with the powered down function, and
6) restores the function to a defined state.

The principal advantages of the Power Control Sequencer (PCS) for management of electrical power over other methods is:

1) power is not applied to functional circuits which are performing no useful function, and
2) the PCS overcomes the inherent latch-up and loading problems associated with integrated circuits when one integrated circuit which has power applied has inputs and/or outputs connected to another integrated circuit which has its power removed.

The principal disadvantage of the Power Control Sequencer (PCS) for management of electrical power is:

1) state and other information electrically stored in the function are lost when power is removed from that function. Separate electronics are required to store any state or other information required for later use prior to removal of power, and to restore the information subsequent to the reapplicaton of power.
2) the parts of the invention which control latch-up and inter-intergrated circuit loading can become a significant design and power management problem in themselves as device complexity increases.

Webster and Pardo also disclosed a method for managing the use of power within individual integrated circuits in "Power Management Apparatus (PMA) for Integrated Circuit Application," U.S. Pat. application Ser. No. 08/185,185, Jan. 21, 1994 which generally:

1) allows the power source of an integrated circuit function to be connected and disconnected on command,
2) connects the input/outputs of the integrated circuit function to external circuitry when the power source is connected to the integrated circuit function, and
3) isolates the input/outputs of the integrated circuit function from external circuitry when the power source is disconnected from the integrated circuit function in order to avoid external circuit loading, and the latch-up phenomena associated with electronics when the input/output nets of a powered-on device are directly connected to the input/output nets of a powered-off device.

4) the method generally solves problem #2 associated with the PCS by integrating the buffer and power control functions directly into each integrated circuit. The apparatus does not provide an improvement against problem #1 associated with the PCS.

As in the Power Control Sequencer, the principal disadvantage of the Power Management Apparatus for management of electrical power is:

1) state and other information electrically stored in the integrated circuit function are lost when power is removed from that integrated circuit function. Separate electronics are required to store any state or other information required for later use prior to removal of power, and to restore the information subsequent to the reapplicaton of power.

The capability to manage the use of power within an electronic device and within individual integrated circuits is important. Even with unclocked CMOS integrated circuits, small amounts of instantaneous power used consistently over a long period of time can added up to a significant amount of total power used. In the two aforeto mentioned Webster/Pardo patent applications, the general philosophy applied to power management is:

1) if a functional circuit is not powered-up, it uses essentially zero power for the time it is "off," regardless of the length of that time.
2) efficient power management practice will power-on only those functional circuits then performing a useful function.
3) when the functional circuit ceases to perform its useful function, power will be removed from it.

In this patent application, Webster/Pardo recognize that certain functional circuits, once they have begun to operate, may enter a state wherein the functional circuit contains useful information while the functional circuit is itself not performing any other useful function other than the storage of that information. If power were completely removed as is defined in the aforeto mentioned patent applications of Webster/Pardo, then this information is lost when power is removed from the functional circuit. Webster/Pardo previously overcame the loss of information by moving the information out of the functional (integrated) circuit into a separate storage area prior to the removal of power.

This patent application describes an apparatus wherein the power to a functional circuit contained in an integrated circuit is not completely removed, but decreased such that the functional circuit is placed in a reduced power mode of operation. This is accomplished by controlling the voltage on integrated circuit's power input net and thereby varying the power used by the integrated circuit. The functional circuit retains all of the state properties it had possessed prior to the assertion of the reduced power mode. Use of the apparatus disclosed in this application eliminates the problem associated with the storage of state and other information in separate electronics external to the functional circuit prior to the removal of power, eliminates the latch-up phenomena associated with substrate reverse bias in the integrated circuit being operated with decreased power (power input net voltage reduced), and protects external circuitry from being overloaded by an integrated circuit operating with low voltage on its power input net. Substantial power savings are realized by functional circuits which incorporate a Nonvolatile Power Management Apparatus relative to power utilized by the same functional circuit without the Nonvolatile Power Management Apparatus.

The present invention creates a "Nonvolatile Power Management Apparatus (NPMA)" for integrated circuits. The NPMA is defined herein having several variations to the primary embodiment. The NPMA combines several electronic "means" in unique ways to perform power management. The NPMA draws from the PMA, replacing one of the PMA building blocks with a different building block. A NPMA changes the PMA function of "power switching means" to a "variable power source means." The NPMA also incorporates the PMA concept of "signal switching means," but with a broader definition. A "variable power source means" and "signal switching means" are combined with functional circuits on integrated circuit substrates to create several new types of integrated circuits which contain the NPMA.

The various embodiments of the NPMA provide the designer with design tools from which power management can be more easily accomplished relative to the prior art. Using the NPMA, power management can be accomplished at the individual integrated circuit level while retaining state and other information during the power management process. Electronic devices designed using the NPMA are simpler to generate, manufacture, and test. They would have a wider range of usefulness and would also be more reliable relative to a PMA or PCS designed into the same equipment. Most importantly, significant amounts of power can be saved in electronic devices which use the NPMA relative to the current state-of-the-art. The inventors firmly believe that this novel device cannot be found anywhere in existing technology.

DEFINITION OF TERMS integrated circuit substrate—a means within or on which electronic components can be constructed and interconnected to form a functional circuit.

integrated circuit—a complex of electronic components and their connections that is produced in or on an integrated circuit substrate.

chip—a means for mechanically supporting an integrated circuit and electrical connecting pins, containing a connection means for connecting the integrated circuit to the electrical connecting pins.

connector—a means for the connection of electronic signals from one physical device to another physical device.

pad—an area of an integrated circuit substrate for bonding a connection wire or other connection means onto the integrated circuit substrate.

net—a connection means for connecting selected electronic component terminals in or on an integrated circuit substrate together in a defined manner.

I/O—A switch, net or pad serving the electronic function of input, or output, or input and output concurrently.

electrical signal—a time variant voltage, as compared to a reference, which exists at a point of interest in an electric circuit.

connection means—a means for transporting an electrical signal or signals from one point in an electric circuit to another.

pwr—An acronym for the word "power."

VPS—An acronym for the words "Variable Power Source."

low impedance—generally less than 5 ohms. The exact limiting value required is a function of the impedance of associated circuitry.

high impedance—generally greater than 10 megohms. The exact limiting value required is a function of the impedance of associated circuitry. Values below 10 megohms are permitted.

power source—a means from which electric power may be drawn.

functional circuit—a means for performing a specified electronic function or group of electronic functions.

asserted state—A logical term implying that a logical function is true or valid. As used herein, when the control input of a variable power source is in the asserted state, the variable power source causes the voltage on its power output terminal to be, in its most general use, equal to the voltage on its power input terminal. Also, as used herein, when the control input of an I/O switch is in the asserted state, the I/O switch presents a low impedance from the I/O switch signal input to the I/O switch signal output. Action caused by the assertion of the control input of a sequencer signal input is defined where used.

deasserted state—A logical term implying that a logical function is false or invalid. As used herein, when the control input of a variable power source is in the deasserted state, the variable power source converts a voltage within a specified range of values present at the variable power source power input terminal to a voltage with a specified range of values at the variable power source power output terminal. The voltage then present on the variable power source power output terminal, being connected to the power input net of a functional circuit, is sufficient to allow the functional circuit to retain all of its internal states. Also, as used herein, when the control input terminal of an I/O switch is in the deasserted state, the I/O switch presents a high impedance from the I/O switch signal input terminal to the I/O switch signal output terminal. Action caused by the deassertion of the control input of a sequencer signal input is defined where used.

variable power source—a means used herein for converting a voltage within a specified range of values present at the its power input terminal to an electrically selectable voltage with a specified range of values at its power output terminal; the power output terminal being connected to an electrical load. A variable power source consists of three terminals: a control input terminal, a power input terminal, and a power output terminal.

As used herein, when the control input terminal is asserted, the variable power source converts a first voltage within a specified range of values present at its power input terminal to a second voltage within a specified range of values at its power output terminal. The voltage then present at its power output terminal is sufficient to allow a functional circuit, whose power is supplied from the variable power source output terminal, to operate within its specified parameters for nominal operation.

When the control input terminal is deasserted, the variable power source converts the first voltage within a specified range of values present at the its power input terminal to a third voltage within a specified range of values at its power output terminal. The voltage then present at its power output terminal is sufficient to allow a functional circuit, whose power is supplied from the variable power source power output terminal, to retain its internal electrical states.

The voltage present on the power output terminal is, generally, higher in the asserted state than it is in the deasserted state. The power used by the functional circuit connected to the variable power source power output terminal is then higher when the variable power source control input terminal is asserted state and lower when the power source control input terminal is deasserted state.

I/O switch—an electronically controllable electronic signal switching means used herein for isolating a powered-on circuit from a powered-off circuit. An I/O switch consists of three terminals: a control input terminal, a signal input terminal, and a signal output terminal. When the control input terminal is asserted, the I/O switch causes a low impedance to be presented between the signal input terminal and the signal output terminal. When the control input terminal is deasserted, the I/O switch causes a high impedance to be presented between the signal input terminal and the signal output terminal.

buffer—a two terminal means for transferring a signal from the buffer's signal input terminal to the buffer's signal output terminal. The buffer's input terminal presents defined characteristics to external electronic devices. In the case of the present invention, the buffer output terminal is capable of driving all of the loads presented by the variable power source and I/O switch control input terminals to which it is connected.

OBJECTS AND ADVANTAGES

The NPMA provides a practical embodiment for implementing system-level power management by controlling the power used in individual integrated circuits. The embodiment combines the several "means" used by the NPMA: variable power source, I/O switches, sequencer, buffer, functional circuit, and integrated circuit in a novel manner.

Accordingly, it is a first object of the present invention to add one or more "variable power source" functions to the functional circuit contained on the substrate of any existing or to-be-developed integrated circuit. The variable power source(s) collectively control the application of power to the functional circuit power nets..

It is a second object of the present invention to add an "I/O switch" function to one or more input, output, or concurrent input and output functions used by a functional circuit contained on the substrate of any existing or to-be-developed integrated circuit. The I/O switch provides for the connection and isolation of functional circuit nets to/from the integrated circuit's I/O pads and, thereby protects the integrated circuit substrate from externally induced latch-up. The I/O switch also protects external circuitry from overload when the functional circuits is operated in its low power mode.

It is a third object of the present invention to provide for the buffering of the control inputs of the variable power sources and I/O switches from external circuitry.

It is a fourth object of the present invention to provide for control of the internal control signal timing of the variable power sources and I/O switches to insure that the integrated circuit's inputs and outputs are isolated from external circuitry during transitions of voltage (power) on the integrated circuit's power nets.

A completely new family of integrated circuits is defined composed of a combination of variable power sources, I/O switches, sequencer, buffer, an integrated circuit substrate and a functional circuit. Electronic devices which incorporate the NPMA chip family will be able to effectively control their use of electrical power while retaining their internal electrical states during the power management process. Management of electrical power use is of prime concern to the United States and this concern is addressed by the present invention.

ADVANTAGES

The present invention gives the designer control of the application of power within any individual integrated circuit, thereby allowing the designer to locate power-controlled devices anywhere in the physical design. Devices do not need to be collocated and constrained to a particular power plane. Power control is commanded via a single control signal which is routed to each integrated circuit as is any other electronic signal. When power is removed from an integrated circuit, the power supply and power plane may remain powered-on. No power loss to capacitive discharge occurs. Power system reliability remains unaffected. As there is very little capacitance within the variable power source-to-integrated circuit internal power plane routing, recovery time is very short when full power is reapplied to the functional circuit. More importantly, the designer can provide power management functions within an electronic device using NPMA technology without the need to uniquely and specifically design a "buffer." It will be a built-in feature of NPMA integrated circuits. Most importantly, internal electrical states are not lost during the power management process.

Incorporation of key power management functions into an integrated package allows the designer to control both the power to the functional circuit and its connection to external circuitry simultaneously through the manipulation of a single control input. This ability of the invention to provide single input control is a powerful design advantage. When the single control input is asserted, power is applied to the functional circuit and all of its input and output nets are connected through a low impedance signal switch to external circuitry: the functional circuit is functioning nominally in-circuit. When the single control input is deasserted, the power supply voltage to the functional circuit is substantially reduced, internal electrical states are retained, and all input and output nets are isolated from external circuitry by a high impedance switch: the functional circuit essentially disappears, in the electrical sense, from the circuit in which it was previously connected and functioning.

A second advantage of this electrical "disappearance" or disconnection of a functional circuit from external circuitry is to allow electrical busses and other external circuits to have an excess number of electrical loads connected to them. Power to the number of functional circuits which present loads exceeding the specified load limit is removed by the NPMA, thereby electrically removing them from the circuit. A controller controls power to all functional circuits through NPMA devices and keeps the number of powered-up functional circuits below the design limit. Functional circuits can be powered-up or powered-down consistent with the needs of the electronic device and the load limit of the bus or other circuitry.

SUMMARY OF THE INVENTION

Figure 2:
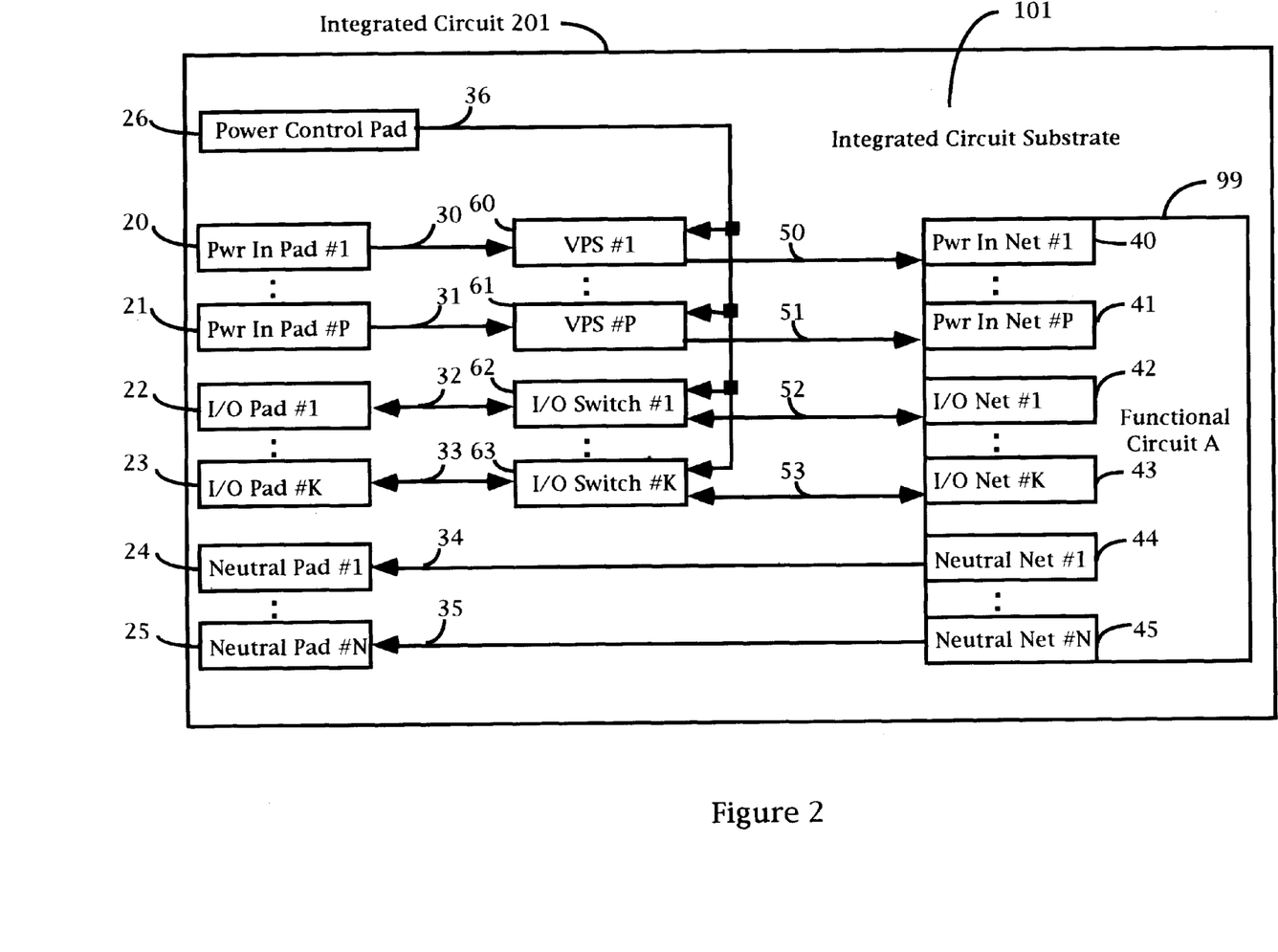
FIG. 2 shows a variable power source means, combined with a I/O switch means, a functional circuit, and an integrated circuit substrate to form the first embodiment of the NPMA.
Figure 3:
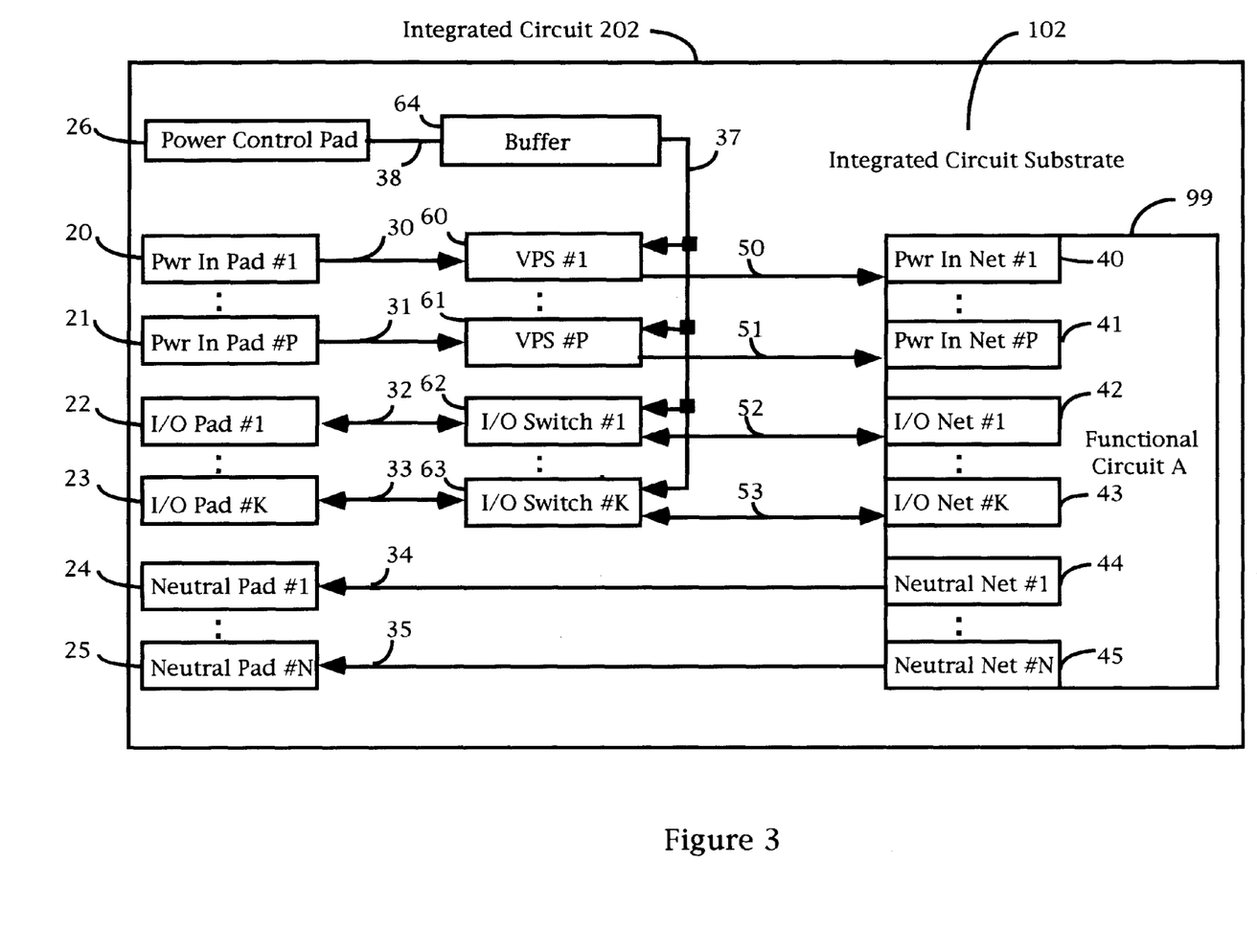
FIG. 3 shows a variable power source means, combined with a I/O switch means, a buffer means, a functional circuit, and an integrated circuit substrate to form the second embodiment of the NPMA.
Figure 4:
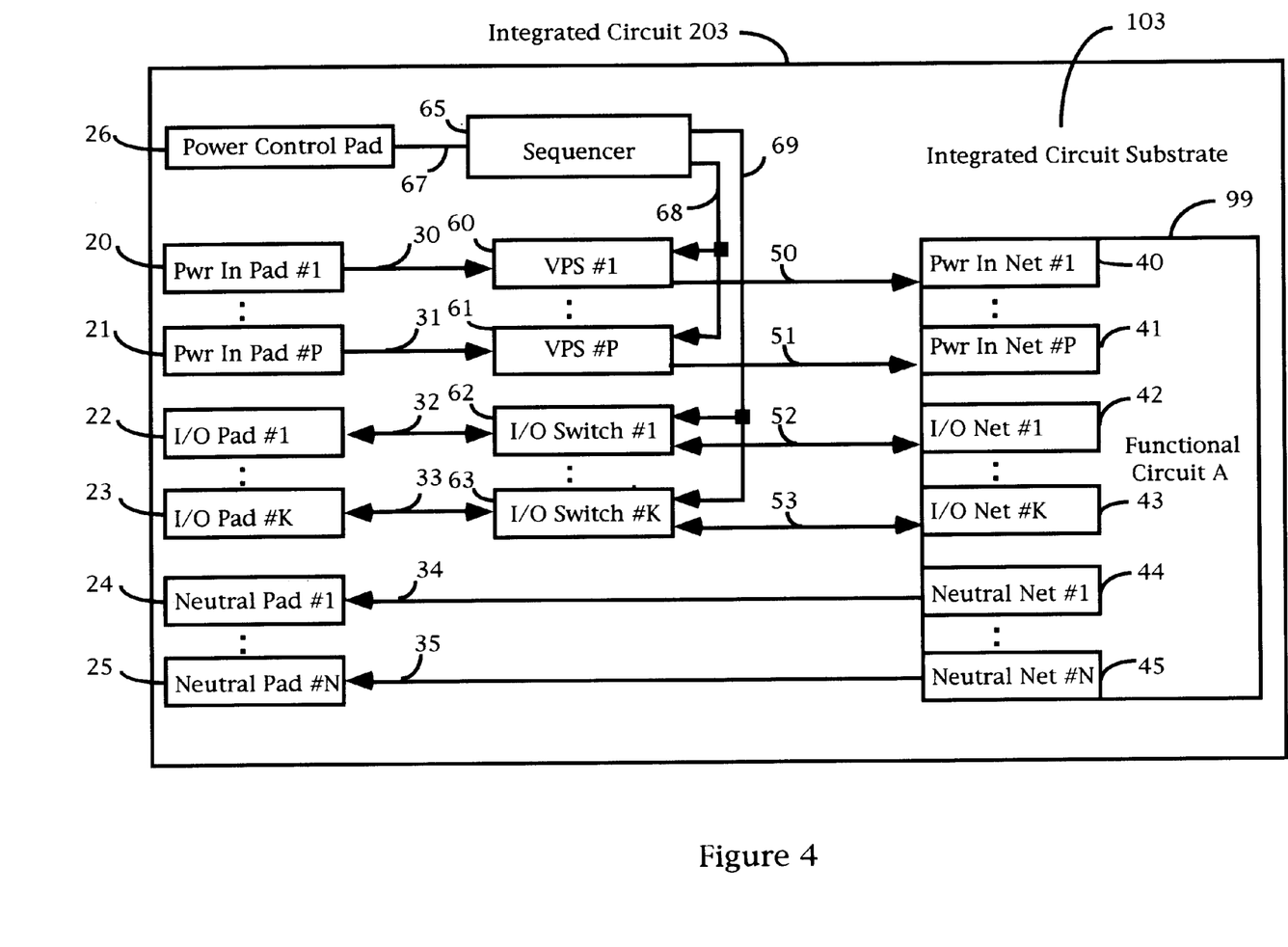
FIG. 4 shows a variable power source means, combined with a I/O switch means, a sequencer means, a functional circuit, and an integrated circuit substrate to form the third embodiment of the NPMA.

The present invention controls the rate of power consumption in any individual integrated circuit by controlling the voltage present on the functional circuit power input net(s), and providing a protective means to prevent functional circuit latch-up and external circuit overload:

The integrated circuit substrate containing an existing or to-be-developed functional circuit is modified by:
  a) adding one or more "variable power source" functions to the integrated circuit substrate as depicted in FIGS. 2–4. The variable power source(s), which serves the function of an electrically variable power source, is inserted between the integrated circuit's normal power source input pad(s) and the integrated circuit's substrate power net(s), and/or
  b) adding one or more "I/O switch" functions to an integrated circuit substrate possessing a functional circuit as depicted in FIGS. 2–4. The I/O switch(s) is inserted between an I/O pad and the integrated circuit substrate I/O net for a given signal. The I/O switch serves as an electrically controllable signal switch between the two points. The I/O switch causes a low impedance connection between the I/O pad and the I/O net when its control input terminal is asserted. The I/O switch causes a high impedance to exist between the I/O pad and the I/O net when its control input terminal is deasserted. The I/O switch first protects the integrated circuit against externally induced latch-up, and second provides for the effective electrical isolation of the I/O net from external circuitry, c) the state of the I/O switch and the variable power source are controlled at their control input terminals by:
1) a single input electrical signal, or,
2) a single, internally buffered input electrical signal, or,
3) two individually time sequenced electrical signals which are themselves driven from a single input electrical signal.

DESCRIPTION OF THE INVENTION

Applicability

The present invention is applicable to most types of digital functional circuits and requires that a new integrated circuit substrate containing the present invention combined with a functional circuit be created.

General Remarks on Content

The Functional Circuit A 99 shown in FIGS. 1–4 may be part of a larger functional circuit residing on Integrated Circuits 200, 201, 202, or 203. It is acknowledged that some functions (not shown) may exist on these integrated circuits which do not require the use of the NPMA. These would be otherwise shown grouped in a "Functional Circuit B" (not shown or numbered). In this event, there is no modification to that part of the integrated circuit substrate involved with Integrated Circuit B due to inclusion of the NPMA as it relates to Functional Circuit A 99: that part of Integrated Circuit 201 through Integrated Circuit 203 associated with Integrated Circuit B remains as it would have been without the present invention. This is considered a trivial rearrangement of the embodiments of the invention and is embraced but not otherwise specifically addressed herein.

Further, an integrated circuit may contain a functional circuit for which a part, the Functional Circuit A 99, is under power management and another part, which we refer to as Functional Circuit C, is not. It is an obvious extension of this invention to have signal connectivity between the Functional Circuit A 99 and Functional Circuit C wherein the NPMA is used to manage the power within the Functional Circuit A 99, and the signals that pass between the Functional Circuit A 99 and Functional Circuit C are controlled by I/O switches. In this event, electrical signals do not necessarily pass through the integrated circuit substrate pads but can transition directly from the Functional Circuit A 99 nets, through an I/O switch to Functional Circuit C nets. This is considered a trivial rearrangement of the embodiments of the invention and is embraced but not otherwise specifically addressed herein.

Also, the power consumption of some functional circuits may be largely dependent on the signal impressed on one or more, but not all, of the integrated circuit I/O pads. For example, the clocking of a clock input of a CMOS chip can be the reason for substantially all of the power consumption within the device. A trivial reduction in configuration of the NPMA can be created wherein only the clock input is modified with an I/O switch inserted between the clock I/O pad the clock I/O net. For this device, the number of variable power sources could be zero, and the number of I/O switches could be as few as one. Power consumption for an integrated circuit which has only a single input modified with an I/O switch could approach that of a fully configured NPMA for the same integrated circuit. This is considered a trivial rearrangement of the embodiments of the invention and is embraced but not otherwise specifically addressed herein.

Conversely, a functional circuit could be created which, when no power is reduced, does not adversely impact external circuitry, as defined by the designer using such a device. Such a functional circuit would not require the use of any I/O switches as an adjunct to the interface of the functional circuit. Using this functional circuit, another trivial reduction in the configuration of the NPMA can be created wherein one or more variable power sources are inserted between the power input pads and the power input nets. For this device, the number of I/O switches could be zero, and the number of variable power sources could be as few as one. This is considered a trivial rearrangement of the embodiments of the invention and is embraced but not otherwise specifically addressed herein.

Also, an integrated circuit may contain two or more completely separate functional circuits on the same substrate, one or more of which have a NPMA incorporated, and thus each separate functional circuit augmented with the NPMA can be power managed independently. This is considered a trivial rearrangement of the embodiments of the invention and is embraced but not otherwise specifically addressed herein.

Further, when using a sequencer for control of the time relationship between activation of the control inputs of the variable power source(s) and I/O switch(es), it may not always be desirable to have all of the I/O switch(es) coupled or uncoupled together. It may be advantageous to have one or more I/O switches transition with the variable power sources while other I/O switch(es) transition separately. This is considered a trivial rearrangement of the embodiments of the invention and is embraced but not otherwise specifically addressed herein.

Inclusion of all the possible combinations in this patent application that could contain the present invention, combined with unmodified functional circuits, or containing combinations which have zero members would unnecessarily expand this application and confuse understanding. These are included herein by reference as obvious extensions of the basic precepts of the invention.

Power and Neutral Terminals

Power and neutral terminals are required for all variable power sources, I/O switches, and buffers shown in any figure or described in the body of the text in this application. These terminals are not specifically shown or described. They are included herein by reference as obvious extensions of the basic precepts of the invention.

The Generic Integrated Circuit

Figure 1:
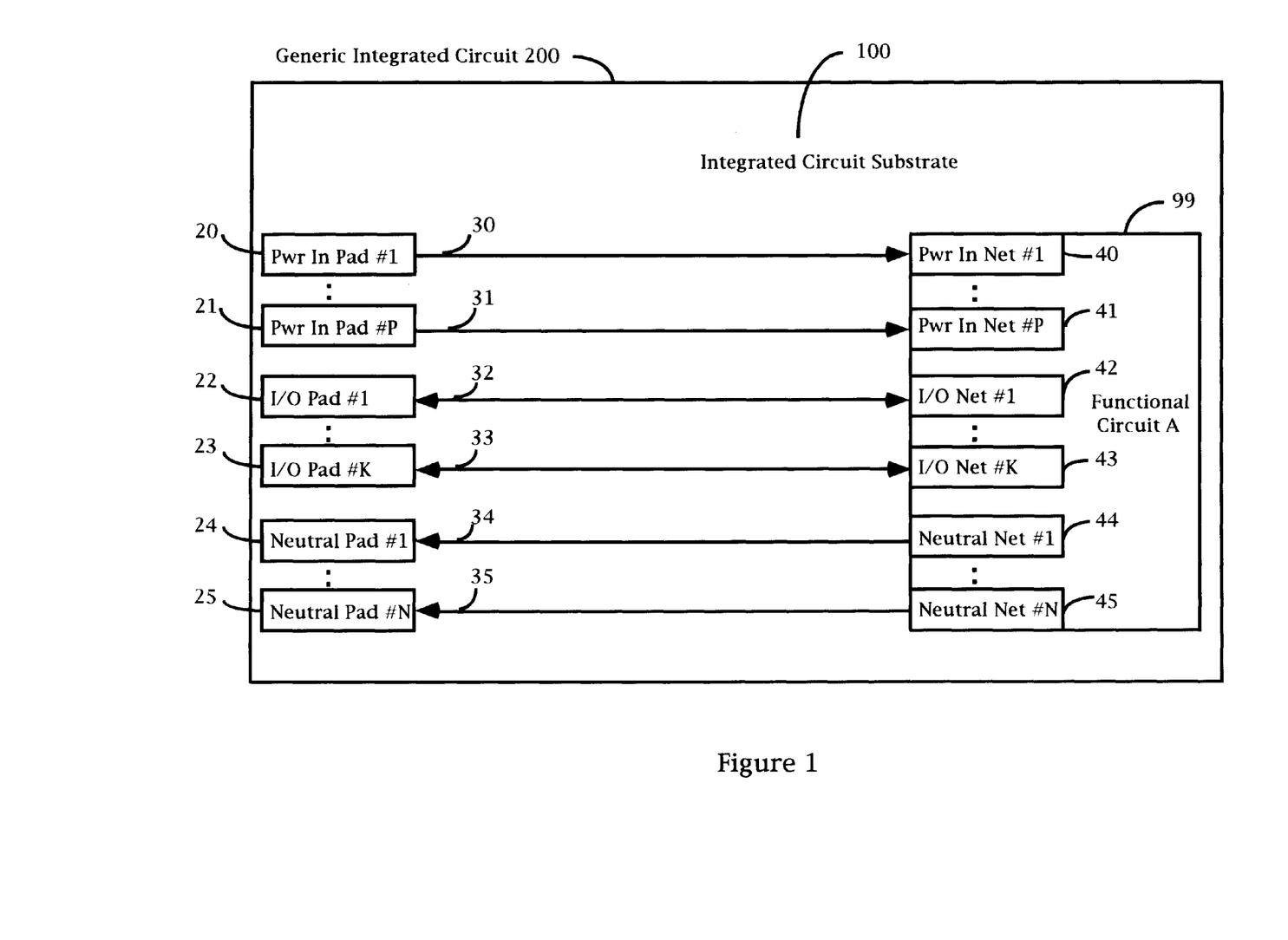
FIG. 1 shows a functional circuit and an integrated circuit substrate combined to form a "generic" integrated circuit.

FIG. 1 shows a Generic Integrated Circuit 200 without the present invention. The figure shows Functional Circuit A 99, which performs the electronic functions of the Generic Integrated Circuit, combined with Integrated Circuit Substrate 100. The interface of the Functional Circuit A 99 is generalized to consist of:

a) some number of power input nets "1" through "P." These are shown as Power In Net #1 40 through Power In Net #P 41 and represent all of the power input interfaces to Functional Circuit A 99. The exact number of power input nets is determined by the nature of the functions performed by Functional Circuit A 99 when the specific integrated circuit is designed. Power entering a power input net is distributed to a load in Functional Circuit A 99.

b) some number of input, output, or output/input signal nets "1" through "K." These are shown as I/O Net #1 42 through I/O Net #K 43 and represent all of the signal interfaces to Functional Circuit A 99. The exact number of input, output, or output/input signal nets is determined by the nature of the functions performed on by Functional Circuit A 99 when the specific integrated circuit is designed.

c) some number of neutral power return nets "1" through "N." These are shown as Neutral Net #1 44 through Neutral Net #N 45. The exact number of neutral power return nets is determined by the nature of the functions performed by Functional Circuit A 99 when the specific integrated circuit is designed.

Each Functional Circuit A 99 net is connected to a pad on the Integrated Circuit Substrate 100 via a connection means. These connections are shown as:

a) Power In Net #1 20 is connected to Power In Pad #1 40 via connection means 30.

b) Power In Net #P 21 is connected to Power In Pad #P 21 via connection means 31.

c) I/O Net #1 22 is connected to I/O Pad #1 22 via connection means 32.

d) I/O Net #K 23 is connected to I/O Pad #K 23 via connection means 33.

e) Neutral Net #1 24 is connected to Neutral Pad #1 24 via connection means 34.

f) Neutral Net #N 25 is connected to Neutral Pad #N 25 via connection means 35.

Power and signals are transported to/from the Functional Circuit A 99 nets to/from Integrated Circuit Substrate 100 pads usually located near the physical edges of Integrated Circuit Substrate 100. Power and signals are then usually transported from the Integrated Circuit Substrate 100 to/from connectors on an integrated circuit body (not shown) using a bonded connection means.

Operationally, power and signals are presented to the Integrated Circuit Substrate 100 through a connection means bonded, usually, to each pad (not shown). Power and signals are then directly transported to/from the pads to their associated nets within the Functional Circuit A 99. The Functional Circuit A 99 is then able to function as it was electrically and logically designed to function.

The construction and operation of any integrated circuit can be conceptually reduced to function with the set of power input, power return, input, output, and input/output nets as shown in FIG. 1.

EMBODIMENTS OF THE INVENTION

Purpose of the Embodiments

The embodiments of the present invention combines variable power sources, I/O switches, buffer functions, sequencer functions, an integrated circuit substrate and a functional circuit in various ways to create three new integrated circuit types numbered 201, 202, and 203 in FIGS. 2–4 respectively. These embodiments control the power applied to the functional circuit, while concurrently retaining existing state values within an integrated circuit in the low power mode of operation, and can connect and isolate the I/O nets of the functional circuit to/from external circuitry, thereby protecting the integrated circuit from latch-up and external circuit overload. These three embodiments differ only by the means by which the power control signal is applied to the variable power source and I/O switch control inputs.

First Embodiment of the Invention

Construction of the First Embodiment

The first embodiment of the present invention is shown in FIG. 2. The integrated circuit defined for Generic Integrated Circuit 200 is shown with variable power source and I/O switch functions combined with it. The new integrated circuit thus created is shown as Integrated Circuit 201. Connection means 30, 31, 32, and 33, which connected the power and I/O pads to the functional circuit nets, shown in FIG. 1, have been removed.

Power In Pad #1 20 is connected to the power input terminal of Variable Power Source #1 60 via connection means 30. The power output terminal of Variable Power Source #1 60 is connected to Power In Net #1 40 via connection means 50. Likewise, Power In Pad #P 21 is connected to the power input terminal of Variable Power Source #P 61 via connection means 31. The power output terminal of Variable Power Source #P 61 is connected to Power In Net #P 41 via connection means 51.

I/O Pad #1 22 is connected to the signal input terminal of I/O Switch #1 62 via connection means 32. The signal output terminal of I/O Switch #1 62 is connected to I/O Net #1 42 via connection means 52. Likewise, I/O Pad #K 23 is connected to the signal input terminal of I/O Switch #K 63 via connection means 33. The signal output terminal of I/O Switch #K 63 is connected to I/O Net #K 43 via connection means 53.

Power Control Pad 26 is connected to the control input terminals on Variable Power Source #1 60 through Variable Power Source #P 61, and I/O Switch #1 62 through I/O Switch #K 63 via connection means 36.

Neutral Pad #1 24 is connected to Neutral Net #1 44 via connection means 34. Neutral Pad #N 25 is connected to Neutral Net #N 45 via connection means 35.

Operation of the First Embodiment

Variable Power Source #1 60 through Variable Power Source #P 61 serve as electronically controlled, power switching means capable of varying the power in Power In Net #1 40 through Power In Net #P 41 respectively. I/O Switch #1 62 through I/O Switch 63 serve as electronically controlled, low impedance signal switches for transporting electrical signals used by I/O Net #1 42 through I/O Net #K respectively.

When the control input terminal of a variable power source is asserted, the variable power source converts a first voltage within a specified range of values present at its power input terminal to a second voltage within a specified range of values at its power output terminal. The first voltage and second voltage are, usually, of approximately equal value. The voltage then present at the variable power source power output terminal is sufficient to allow a functional circuit, whose power is supplied from the variable power source output terminal, to operate within its nominally specified parameters.

Similarly, when the control input terminal of any I/O switch is asserted, the I/O switch presents a low impedance from its signal input terminal to its signal output terminal.

When the control input terminal of any variable power source is deasserted, the variable power source converts the first voltage within a specified range of values present at the its power input terminal to a third voltage within a specified range of values at its power output terminal. The voltage then present at the variable power source power output terminal is sufficient to allow a functional circuit, whose power is supplied from the variable power source power output terminal, to retain its internal electrical states.

Similarly, when the control input terminal of any I/O switch is deasserted, the I/O switch presents a high impedance from its signal input terminal to its signal output terminal.

The "first," "second," and "third" output voltages of a variable power source may be different from one variable power source to another.

The first embodiment of the present invention may operate in either of two conditions defined below. The operational condition of the first embodiment of the present invention is dependent upon the state of the signal present on Power Control Pad 20.

Condition 1:

A voltage capable of asserting the control input terminals of Variable Power Source #1 60 through Variable Power Source #P 61, and I/O Switch #1 62 through I/O Switch #K 63 is applied to Power Control Pad 26 by an external agent (not shown). This voltage is transported to the control input terminals of Variable Power Source #1 60 through Variable Power Source #P 61, and I/O Switch #1 62 through I/O Switch #K 63 by connection means 36. The devices, Variable Power Source #1 60 through Variable Power Source #P 61, and I/O Switch #1 62 through I/O Switch #K 63, then enter the asserted state.

Electrical power from a power source (not shown) which is connected to Power In Pad #1 20 is transported from Power In Pad #1 20 to the power input terminal of Variable Power Source #1 60 via connection means 30. Variable Power Source #1 60 then converts the "first" voltage on its power input terminal to its "second" voltage on its power output terminal as described above. The "second" voltage is transported to Power In Net #1 40 via connection means 50 where it enters Functional Circuit 99. Functional Circuit 99 then performs those electrical functions for which it is designed when using nominal operational power available from Power In Net #1 40.

Similarly, electrical power from a power source (not shown) which is connected to Power In Pad #P 21 is transported from Power In Pad #P 21 to the power input terminal of Variable Power Source #P 61 via connection means 31. Variable Power Source #P 61 then converts the "first" voltage on its power input terminal to its "second" voltage on its power output terminal as described above. The "second" voltage is transported to Power In Net #P 41 via connection means 51 where it enters Functional Circuit 99. Functional Circuit 99 then performs those electrical functions for which it is designed when using nominal operational power available from Power In Net #P 41.

An electrical signal from a signal source (not shown) which is connected to I/O Pad #1 22 is transported from I/O Pad #1 22 to the signal input terminal of I/O Switch #1 62 via connection means 32, through the low impedance then attained by the switching means contained in I/O Switch #1 62, to the signal output terminal of I/O Switch #1 62, and via connection means 52 to I/O Net #1 42 where it enters Functional Circuit 99. Functional Circuit 99 then performs those electrical functions for which it is designed when using signals available from I/O Net #1 42.

Similarly, an electrical signal from a signal source (not shown) which is connected to I/O Pad #K 23 is transported from I/O Pad #K 23 to the signal input terminal of I/O Switch #K 63 via connection means 33, through the low impedance then attained by the switching means contained in I/O Switch #K 63, to the signal output terminal of I/O Switch #K 63, and via connection means 53 to I/O Net #K 43 where it enters Functional Circuit 99. Functional Circuit 99 then performs those electrical functions for which it is designed when using signals available from I/O Net #K 43.

Electrical and signal power used by Functional Circuit 99 is returned to Neutral Pad #1 24 through Neutral Pad #N 25 from Neutral Net #1 44 through Neutral Net #N 45 via connection means 34 and connection means 35 respectively.

Condition 2:

A voltage capable of deasserting the control input terminals of Variable Power Source #1 60 through Variable Power Source #P 61, and I/O Switch #1 62 through I/O Switch #K 63 is applied to Power Control Pad 26 by an external agent (not shown). This voltage is transported to the control input terminals of Variable Power Source #1 60 through Variable Power Source #P 61, and I/O Switch #1 62 through I/O Switch #K 63 by connection means 36. The devices, Variable Power Source #1 60 through Variable Power Source #P 61, and I/O Switch #1 62 through I/O Switch #K 63, then enter the deasserted state.

Electrical power from a power source (not shown) which is connected to Power In Pad #1 20 is transported from Power In Pad #1 20 to the power input terminal of Variable Power Source #1 60 via connection means 30. Variable Power Source #1 60 then converts the 'first' voltage on its power input terminal to its "third" voltage on its power output terminal as described above. The "third" voltage is transported to Power In Net #1 40 via connection means 50 where it enters Functional Circuit 99. Those parts of Functional Circuit 99 which receive power from connection means 50 then have sufficient power available to retain their electrical states.

Similarly, electrical power from a power source (not shown) which is connected to Power In Pad #P 21 is transported from Power In Pad #P 21 to the power input terminal of Variable Power Source #P 61 via connection means 31. Variable Power Source #P 61 then converts the 'first' voltage on its power input terminal to its "third" voltage on its power output terminal as described above. The "third" voltage is transported to Power In Net #P 41 via connection means 51 where it enters Functional Circuit 99. Those parts of Functional Circuit 99 which receive power from connection means 51 then have sufficient power available to retain their electrical states.

An electrical signal from a signal source (not shown) which is connected to I/O Pad #1 22 is transported from I/O Pad #1 22 to the signal input terminal of I/O Switch #1 62 via connection means 32. The switching means contained in I/O Switch #1 62, having attained a very high impedance relative to the impedance of I/O Net #1 42 to Neutral Net #1 44, impedes the passage of any electrical signal to the signal output terminal of I/O Switch #1 62 and thus substantially no electrical signal enters 1/0 Net #1 42 via connection means 52. Substantially no signal enters Functional Circuit 99 having its source from I/O Pad #1 22.

Similarly, an electrical signal from a signal source (not shown) which is connected to I/O Pad #K 23 is transported from I/O Pad #K 23 to the signal input terminal of I/O Switch #K 63 via connection means 33. The switching means contained in I/O Switch #K 63, having attained a very high impedance relative to the impedance of I/O Net #K 43 to Neutral Net #N 45, impedes the passage of any electrical signal to the signal output terminal of I/O Switch #K 63 and thus substantially no electrical signal enters I/O Net #K 43 via connection means 53. Substantially no signal enters Functional Circuit 99 having its source from I/O Pad #K 23.

Second Embodiment of the Invention

Construction of the Second Embodiment

The second embodiment of the present invention creates a new Integrated Circuit 202, and is shown in FIG. 3. The construction of this embodiment is identical to that shown for the first embodiment except the circuitry below has been added or deleted as noted.

1) connection means 36 is eliminated.
2) Buffer 64 has been added.
3) Power Control Pad 26 is connected to the signal input terminal of Buffer 64 via connection means 38.
4) The output of Buffer 64 is connected to the control input terminals on Variable Power Source #1 60 through Variable Power Source #P 61, and I/O Switch #1 62 through I/O Switch #K 63 via connection means 37.
5) the new substrate used is shown as Integrated Circuit Substrate 102.

Operation of the Second Embodiment

The second embodiment of the present invention is operated identically to the first embodiment of the present invention except as it relates to the addition of Buffer 64:

1) Power control signals entering at Power Control Pad 26 are now transferred to the signal input terminal of Buffer 64. The signal output terminal of Buffer 64 follows the signal input of Buffer 64 and is capable of driving all of the signal loads presented by the input terminals of Variable Power Source #1 60 through Variable Power Source #P 61, and I/O Switch #1 62 through I/O Switch #K 63. Power control signals exiting the signal output terminal of Buffer 64 enter the control input terminals of Variable Power Source #1 60 through Variable Power Source #P 61, and I/O Switch #1 62 through I/O Switch #K 63. This signal is interpreted as asserted or deasserted by these devices as defined under "Operation of the First Embodiment," above.

Third Embodiment of the Invention

Construction of the Third Embodiment

The third embodiment of the present invention creates a new Integrated Circuit 203, and is shown in FIG. 4. The construction of this embodiment is identical to that shown for the first embodiment except:

1) connection means 36 is eliminated.
2) Power Control Pad 26 is connected to the signal input terminal of Sequencer 65 via connection means 67.
3) Sequencer 65 has two output terminals: a Variable Power Source control output terminal and a I/O switch control output terminal. The Variable Power source control output terminal of Sequencer 65 is connected to the control input terminals on Variable Power Source #1 60 through Variable Power Source #P 61 via connection means 68. The I/O switch control output terminal of Sequencer 65 is connected to the control input terminals on I/O Switch #1 62 through I/O Switch #K 63 via connection means 69.
4) the new substrate used is shown as Integrated Circuit Substrate 103.

Operation of the Third Embodiment

The third embodiment of the present invention is operated identically to the first embodiment of the present invention except as it relates to the addition of Sequencer 65:

1) Power control signals entering at Power Control Pad 26 are now transferred to the signal input terminal of Sequencer 65.
2) Sequencer 65 is a means for controlling the relative time relationship of changes in the state of the Variable Power Source control output terminal and the I/O switch control output terminal as follows:
   a) Assertion of the signal input terminal of Sequencer 65 first causes the assertion of the Variable Power Source control output terminal of Sequencer 65. This asserted output terminal is connected to the control input terminals of Variable Power Source #1 60 through Variable Power Source #P 61 via connection means 68. As described in "Operation of the First Embodiment," above, power is passed into Power In Net #1 40 through Power In Net #P 41.
   Secondly, the Sequencer 65 causes the assertion of the I/O switch control output terminal of Sequencer 65. This asserted output terminal is connected to the control input terminals of I/O Switch #1 62 through I/O Switch #K 63 via connection means 69. I/O Switch #1 62 through I/O Switch #K 63 then operate in the asserted mode as described in "Operation of the First Embodiment," above.
   The time between the assertion of the control input terminals of Variable Power Source #1 60 through Variable Power Source #P 61 and the control input terminals of I/O Switch #1 62 through I/O Switch #K 63 is sufficient (order of nanoseconds) to allow the power to stabilize in Functional Circuit 99 prior to the connection of the I/O pads to the I/O nets of Functional Circuit 99.
   b) Deassertion of the signal input terminal of Sequencer 65 first causes the deassertion of the I/O switch control output terminal of Sequencer 65. This deasserted output terminal is connected to the control input terminals of I/O Switch #1 62 through I/O Switch #K 63 via connection means 69. I/O Switch #1 62 through I/O Switch #K 63 then operate in the deasserted mode as described in "Operation of the First Embodiment," above.
   Secondly, the Sequencer 65 causes the deassertion of the Variable Power Source control output terminal of Sequencer 65. This deasserted output terminal is connected to the control input terminals of Variable Power Source #1 60 through Variable Power Source #P 61 via connection means 68. As described in "Operation of the First Embodiment," above, power entering into Power In Net #1 40 through Power In Net #P 41 is reduced.

The time between the deassertion of the control input terminals of I/O Switch #1 62 through I/O Switch #K 63 and the control input terminals of Variable Power Source #1 60 through Variable Power Source #P 61 is sufficient (order of nanoseconds) to allow the I/O pads to be isolated from the I/O nets of Functional Circuit 99 before power is reduced to Functional Circuit 99

Concluding Remarks

It should now be apparent to those skilled in the art that a novel apparatus for managing the power used in an individual integrated circuit has been invented. The apparatus provides for the retention of internal states during the power management and provides for nominal operation during the high power mode. The apparatus provides for circuit anomalies which occur between interconnected functional circuits, some of which have full power applied to their power inputs and some of which have reduced power applied to their power inputs. Effective isolation of the functional circuit signal functions from external circuitry is achieved when the functional circuit is operated in the low power mode.

It should also be apparent that the present invention provides electronic designers with a new and practical tool for controlling the power consumption of complex electronic devices.

It should be further apparent that the present invention creates a completely new family of electronic devices capable of managing their use of electrical power on an individual basis. The invention applies to existing, or to be developed, integrated circuits and creates a new integrated circuit that has the original function in-place, but with the power management function incorporated.

It should be further apparent to those skilled in the art that various changes in the form and the details of the invention as shown and described may be made. It is intended that such changes be included within the spirit and scope of the claims appended hereto.

We claim:

1. A power management apparatus for regulating the use of electrical energy in an internal functional circuit, the power management apparatus comprising:

an integrated circuit substrate whereon electrical circuits which perform the functions of 1) the internal functional circuit, 2) a variable power source means, and 3) a switching means are constructed, wherein electrical power is controllably passed from an external power supply through the variable power source means to the internal functional circuit, wherein one or more first electrical signals are controllably passed between an external functional circuit and the internal functional circuit via the switching means, and wherein a second externally generated electrical signal controls the value of the electrical power output by the variable power source means via a first control input of the variable power source means and further controls the coupling action in the switching means via a second control input of the switching means, the integrated circuit substrate being a means for constructing and interconnecting electrical circuits, the internal functional circuit being a means for performing an electrical function, the variable power source means for converting a voltage within a specified range of values present at the a power input terminal to a first electrically selectable voltage with a specified range of values at a power output terminal in response to the assertion of said second externally generated electrical signal, the power input terminal being connected to said external power supply and the power output terminal being connected to one or more power input networks of the internal functional circuit, and for converting the voltage within a specified range of values present at the power input terminal to a second electrically selectable voltage with a specified range of values at the power output terminal in response to the deassertion of said second externally generated electrical signal, the power input terminal being connected to said external power supply and the power output terminal being connected to one or more power input networks of the internal functional circuit, the second electrically selectable voltage being of a value less than the first electrically selectable voltage, the switching means for coupling said first electrical signals passed between the external functional circuit and the internal functional circuit in response to the assertion of said second externally generated electrical signal, and for uncoupling said first electrical signals passed between the external functional circuit and the internal functional circuit in response to the deassertion of said second externally generated electrical signal, the improvement allowing the management of power to be distributed and decentralized onto the individual integrated circuit substrate where the application of power is to be managed, and allowing the retention of information stored in the integrated circuit when the integrated circuit is operated in a reduced power mode, and allowing submicrosecond recovery of internal functional circuit function upon the assertion of the second externally generated electrical signal.

2. The power management apparatus of claim 1 further including a buffering means constructed on the integrated circuit substrate for electrically isolating the second externally generated electrical signal from the first control input of the variable power source means and the second control input of the switching means, said second externally generated electrical signal being passed through the buffering means to the first control input of the variable power source means and to the second control input of the switching means.

3. The power management apparatus of claim 1 further including a sequencing means constructed on the integrated circuit substrate for controlling the relative time relationship of changes in the power output by the variable power source means and in the coupling in the switching means, said second externally generated electrical signal being separated by the sequencing means into at least a third electrical signal passed from the sequencing means to the first control input of the variable power source means and a fourth electrical signal passed from the sequencing means to the second control input of the switching means, wherein the time relationship of the assertion and deassertion of the third electrical signal and the fourth electrical signal is controlled by the sequencing means.

* * * * *